Aug. 18, 1953  R. A. WITTMANN  2,649,114
MAGNETIC PILOT VALVE
Filed Oct. 8, 1949
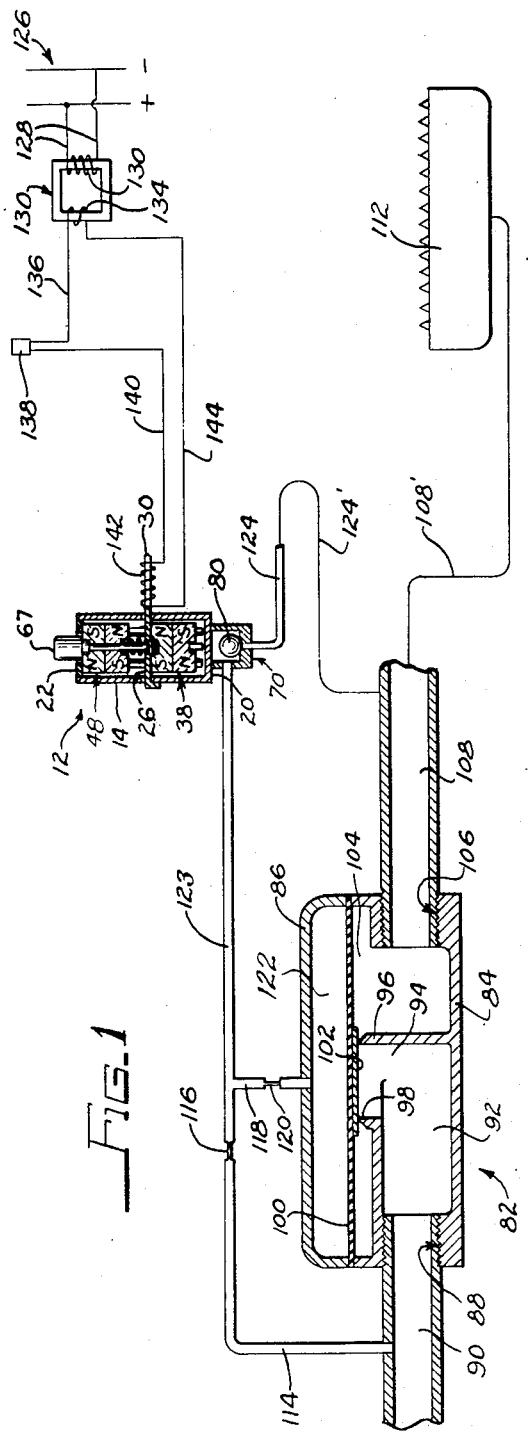
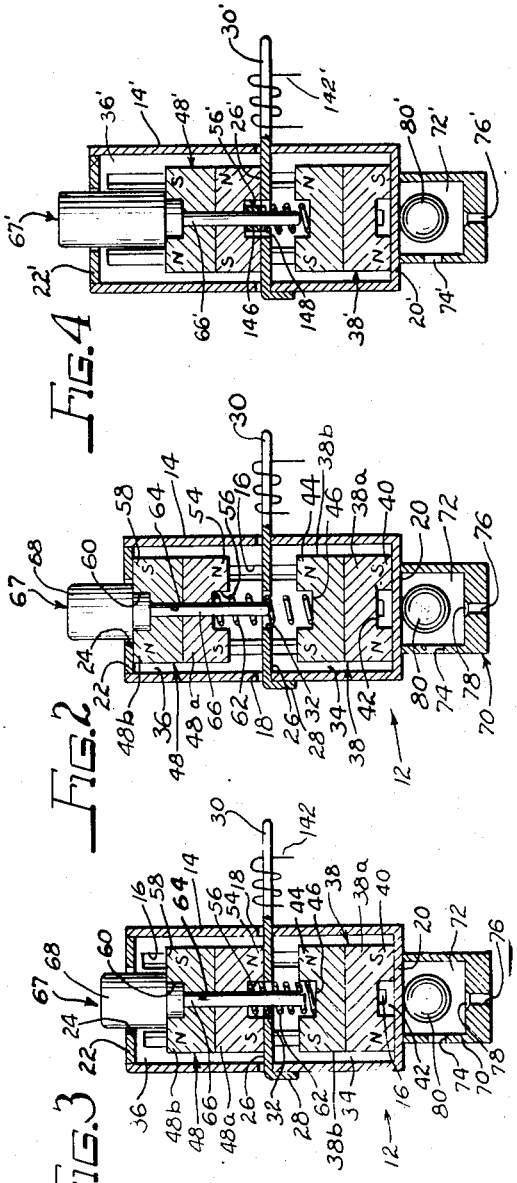
Inventor
Robert A. Wittman
Bair + Freeman
atty.

Patented Aug. 18, 1953

2,649,114

UNITED STATES PATENT OFFICE 2,649,114

MAGNETIC PILOT VALVE

Robert A. Wittmann, Chicago, Ill.

Application October 8, 1949, Serial No. 120,387

12 Claims. (Cl. 137—638)

This invention relates to means for controlling a diaphragm gas valve, and more particularly, a means for causing the diaphragm valve to move to fully open or full closed position.

The diaphragm actuator of the present invention is employed for retaining a valve open under normal conditions, and for causing the valve to close under abnormal conditions, such as power failure, extinguishment of the pilot flame, etc.

An object of the present invention is the provision of a diaphragm actuator for controlling a valve, by means of which the valve is closed upon power failure, and opened automatically when the power source is re-established.

Another object is the provision of a device for opening and closing a valve for controlling flow of gas to a burner in a space to be heated, which is particularly applicable to control by a thermostatic switch whereby the valve is opened or closed in response to temperature changes in the space to be heated.

Another object is the provision of a diaphragm actuator for controlling a valve, by means of which the valve is closed upon power failure, and can be actuated manually for opening the valve, and retaining it open, while the power remains off.

A more specific object of the invention is the provision of a diaphragm actuator having a gas line therethrough, and a permeable valve closure element for closing the gas line, the valve closure being controlled by a magnet which in turn is controlled by conditions existing in response to whether the power is on or off.

A further object is the provision of a modified form of diaphragm actuator of the general character referred to, for controlling a valve, which closes the valve when the power fails, but which must be manually reset when the power is re-established.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is an illustration of the diaphragm actuator in a gas control system in which the diaphragm actuator is shown in section and the elements of the system are shown in section or illustrated diagrammatically;

Figure 2 is a sectional view of the diaphragm actuator on a scale enlarged with respect to the illustration of Figure 1 and showing the parts of the actuator in a different position;

Figure 3 is a sectional view of the actuator illustrating the parts in a still different position; and Figure 4 is a sectional view of a slightly modified form of diaphragm actuator.

Referring in detail to the drawings, attention is directed to Figure 1 wherein the diaphragm actuator is indicated as a whole at 12. For purposes of convenience the details of the diaphragm actuator will now be described and reference may also be had to Figures 2 and 3 which show the various elements on a larger scale and therefore more clearly.

The diaphragm actuator includes a casing 14 which may be made of metal but it must be non-magnetic. The casing 14 may be cylindrical or it may be polygonal in cross section, and is also preferably of open work construction or in the form of a cage having openings 16 extending vertically for the purpose of permitting circulation of air through the casing. The openings 16 may be formed on each of opposite sides and in each of other opposite sides, are transversely aligned holes or openings 18 disposed substantially midway between the top and bottom of the casing. The bottom element of the casing 14 designated at 20 is paramagnetic and if preferred this element 20 may be formed integral with the remainder of the casing and in the latter case the whole casing would be paramagnetic. The casing 14 is formed with an open top which is closed with a plate or washer 22 having a central opening 24. The plate 22 is of high permeability steel and is secured in the casing 14 in any suitable manner.

Disposed in the openings 18 is a strip or plate 26 of Curie metal having a down turned portion 28 secured to the casing and a horizontal portion extending through the aligned holes 18 where an extended end 30 reaches out the opposite side. Preferably the Curie metal strip 26 is securely held in rigid position in the openings 18.

Attention is directed to the composition of the Curie metal strip 26. Curie metal is an alloy of certain metals possessing peculiar permeability characteristics. Curie metal is permeable below a predetermined temperature and non-permeable above that temperature. The particular Curie point or that point dividing the permeability and non-permeability is fixed for any given Curie metal, but the Curie point can be predetermined by the proportion of the various elements making up the metal. For example, a Curie metal can be alloyed so as to have a Curie point of for example, 300° F., 400° F., etc. In the present instance the exact Curie point of the strip 26 need not be exactly predetermined but it must be well above room temperature and may be of 200° F., 300° F., etc. The strip 26 is provided with an opening 32 centrally disposed with respect to the casing 14, and the width of the strip 26 is preferably substantial and may be of the width of the casing 14 in the direction viewed by the observer.

The Curie metal strip 26 may also be referred to as an armature and will be so designated at times herein. The strip 26 divides the casing 14 into a lower part 34 and an upper part 36. In the lower part 34 is a permanent magnet 38 which is made up of two parts 38a and 38b. Each part 38a and 38b is a complete magnet, of modified horseshoe type. The parts 38a and 38b are turned back to back and disposed with the respective opposite poles in register. The attraction between the two parts 38a and 38b may be sufficient to retain the parts together but they may also be positively secured together as by bolts and such magnet assemblies are customary on the market. The part 38a has poles 40 extending downwardly between which is a cavity 42 and likewise the magnet part 38b has poles 44 between which is a cavity 46.

In the upper part 36 of the casing 14 is a permanent magnet 48 similar in all respects to the magnet 38 and is made up of parts or elements 48a and 48b. The poles of the part 48a are indicated at 54 between which is a cavity 56 and the poles of the part 48b are indicated at 58 between which is a cavity 60.

It will be noted that the poles of the respective magnets 38 and 48 are arranged with their adjacent like poles opposing, that is, the north pole 44 is opposite the north pole 54 and similarly the south pole 44 is opposite the south pole 54. It will be understood that in the construction of the diaphragm actuator the various elements are not assembled in the order herein described. Each of the permanent magnets 38 and 48 is movable vertically in the respective part of the casing to a limited extent and the degree of such movement will be explained more fully later.

Between the two magnets 38 and 48 is a compression spring 62 being fitted in the respective cavities 46 and 56 and extending through the opening 32 in the Curie metal strip 26. The spring 62 operates to bias the two magnets apart. The upper magnet 48 is provided with a central hole 64 in which is fitted a pin 66 forming a part of a reset stem 67 of which the head or knob is indicated at 68. A shoulder is formed between the stem 66 and head 68 which engages the upper surface of the magnet 48 and the pin 66 extends down below the magnet and through the opening 32 to a position for engaging the lower magnet 38 on occasion.

Below the casing 14 is a cup shaped element 70 secured to the element 20 of the casing in gastight relationship. The cup shaped element 70 is also provided with an inlet port 74 and an outlet port 76, the latter having a valve seat 78.

In the chamber 72 is a steel ball 80 which serves as a closure element and is adapted to seat on the valve seat 78. The ball 80 is of a diameter preferably substantially less than the transverse dimension of the chamber 72 but of course greater than the seat 78.

The ball 80 is of high permeability steel adapted to be attracted to the magnet 38 under certain conditions. Also the ball 80 may be of Curie metal having a Curie point of a substantially higher temperature than that of the strip 26. The purpose of the ball 80 being of Curie metal is for safety's sake and will be referred to later.

Attention is again directed to Figure 1 and particularly to the various elements making up the gas control system. The numeral 82 refers to a diaphragm valve which may be of conventional construction and for that reason the various elements have been shown in their simplest form. The valve 82 includes a lower part 84 and a cap 86. The lower part 84 includes an inlet port 88 in which is secured a pipe 90 leading from a gas main. The pipe 90 communicates with the space 92 forming an inlet chamber of the valve which terminates in a space 94 defined by an upstanding tubular element 96 which opens upwardly and is provided with a valve seat 98. A diaphragm 100 is secured at its marginal edge between the lower part 84 and the cap 86 and is provided with a valve closure element 102 on its underside for engaging the valve seat 98. Surrounding the tubular element 96 is an outlet chamber 104 having an outlet port 106 in which is secured a line or pipe 108. The pipe 108 is shown partially in section, and the remainder of the pipe is shown diagrammatically by the line 108' leading to the gas burner 112.

Leading from the inlet pipe 90 is a by-pass line 114 in which is a constricting orifice 116. The line 114 has one branch 118 which includes a constricting orifice 120 and communicates with the space 122 in the valve above the diaphragm 100. The line 114 also includes another branch 123 connected in the inlet port 74 of the chamber 72 of the diaphragm actuator. Leading from the outlet port 76 of the chamber 72 is a line 124 which leads as shown diagrammatically by the line 124' into the pipe 108.

A power line 126 has leads 128 connected with the primary winding 130 of a transformer 132. A reduced-voltage secondary winding indicated at 134 has one lead 136 connected with a thermostatic switch 138 located in the space to be heated by the burner 112. The thermostatic switch 138 is shown only diagrammatically since any form of switch may be employed, and is so arranged that it is closed when the temperature of the space to be heated falls below a predetermined point, and opened when the temperature goes above that predetermined point. The switch 138 is provided with a lead 140 connected at one end with an electrical resistance heating element 142 coiled around the extension 30 of the Curie metal strip 26, and leading from the other end of the element 142 is a lead 144 connected to the secondary winding 134.

Attention is now directed to Figure 4 showing a diaphragm actuator similar to the embodiment previously described except as specifically referred to. For purposes of identification the reference numerals in Figure 4 are the same as in the previous illustrations except that they are provided with prime markings. The actuator in Figure 4 differs from the previous embodiment in that the casing 14' is higher than the casing 14 above the Curie metal strip 26'. The Curie metal strip 26' is disposed at the same distance above the bottom of the casing but the upper part 36' of the casing is longer or higher than the corresponding upper part 36 of the previous embodiment. Likewise the reset stem 67' is longer than the reset stem 65 so that when the upper magnet 48' is down against the Curie metal strip 26' the upper end of the head 68' will extend out through the top of the casing.

Surrounding the pin 66' is a sleeve 146 fitted in the cavity 56' and below the sleeve 146 is a key or pin 148 fitted in a transverse hole in the pin 66'. The purpose of the sleeve 146 and locking pin is for enabling the reset stem 65' to lift the upper magnet 48' upwardly, when the reset stem is grasped and lifted.

Use and operation

The position of the various parts of the diaphragm actuator 12 in Figure 1 indicates that the power is turned off. This may result from power failure in the line 126, or it may result simply in the thermostatic switch 138 being open, and in either event there is no current passing through the heating element 142. As a consequence the Curie metal strip 26 is cold or below its Curie point, and therefore permeable. The lower magnet 38 is attracted to the strip 26 and held in its upper position thereby at the top of the lower part 34 of the casing. In such position of the magnet 38 its force of attraction is not sufficient to attract and hold the ball 80 and the ball therefore drops onto the valve seat 78 and closes the outlet port 76. It was pointed out above that the bottom element 20 of the casing is paramagnetic and the attractive force of the magnet is exerted substantially entirely on the ball 80 in that direction.

When the ball 80 is in lowered position and closing the outlet port 76, gas pressure from the by-pass line 114 builds up in the chamber 72 and this gas pressure is propagated out through the branch lines 123 and 113 and into the chamber or space 122. The gas pressure resulting from the gas entering from the pipe 90 also is exerted upwardly on the diaphragm 100, but due to the greater area exposed to the gas pressure in the chamber 122 on the upper side of the diaphragm, the diaphragm is held downwardly closing the valve seat 98. No gas flows through the valve to the burner.

In the position of the magnets shown in Figure 1 not only is the lower magnet 38 held upwardly by the strip 26 but the upper magnet 48 is attracted to the steel element 22 and held thereby. It will be recalled that the element 22 is of high permeability steel and the attraction thereto by the magnet is sufficient to retain the magnet in its upper position. The reset stem 65 is of course carried upwardly by the upper magnet and extends above the casing in the position illustrated in Figures 1 and 2.

When the power again comes on either by reason of the power being restored in the line 126 or closing of the switch 138, current passes through the heating element 142 and raises the temperature of the Curie metal strip above its Curie point. Thereafter the strip 26 becomes non-permeable and the attraction thereto by the lower magnet 38 is lost and the magnet accordingly drops to the position shown in Figure 2. The magnet then attracts the ball 80 lifting it off of the valve seat and permitting the gas to flow through the chamber 72. The outlet from the chamber 72 communicates with the pipe 108 merely for the purpose of convenience and may communicate with any other place where exhaust gas may be received. When the pressure is relieved in the chamber 72 it is also relieved in the space 122 and the pressure of the gas in the inlet chamber 92 lifts the diaphragm off of the valve seat 98 and permits gas to flow through the valve to the burner 112. This condition exists until for example, the temperature of the space to be heated in which the thermostatic switch 138 is located, reaches the predetermined temperature at which the switch opens. After the switch opens the heating element 142 becomes ineffective and the Curie metal strip 126 cools down to a point below its Curie point, and becoming permeable, the magnet 38 is attracted to it permitting the ball 80 to drop. In the normal on-and-off cycle, the upper magnet 48 remains attracted to the steel element 22 and held thereby in its upper position, and even when the strip 26 cools and becomes permeable, the upper magnet does not drop.

As brought out in the introduction, the diaphragm actuator can also be used as a reset means for opening the valve when the power or current is shut off. To do this, the reset stem 67 is forced downwardly to the position illustrated in Figure 3 until the upper magnet 48 engages the Curie metal strip 26, and it will be recalled that the strip 26 is cool and permeable because the current is off, and therefore the magnet 48 is attracted to the strip 26 and held thereby against the attraction of the magnet to the element 22. In the downward movement of the reset stem 67 the lower end of the pin 66 engages the magnet 38 and forces it downwardly away from the strip 26, moving it out of the attractive force to the strip 26 and into the lower position. Thereafter the spring 62 retains the lower magnet 38 in engagement with the lower element 20 and in such position the attractive force to the strip 26 is not sufficient for the magnet 38 to rise. The magnet 38 therefore attracts the ball 80 to upper position opening the outlet port 76. When the device is used as a manually reset device when the power is off, it must of course be watched and set to its original position when the desired temperature is reached.

After being employed as a manually reset device when the power again comes on, the heating element 142 heats the Curie metal strip 26 above its Curie point so that it loses its permeability, whereupon the upper magnet 48 is attracted to the high permeability steel element 22 and raised thereby. The device is then in a position of the parts illustrated in Figure 2 ready for the normal on-and-off cycle of operation as explained above.

Attention is now directed to Figure 4 showing a modified form which is employed in those cases where it is desired that the device be manually reset after the power is re-established. The length of the upper part 36' of the casing is such that when the magnet 48' is in its lower position the attractive force of the magnet to the steel element 22' is not sufficient to raise the magnet upwardly. This is true even when the Curie metal is above the Curie point and non-permeable and hence when there is no attraction thereto by the magnet 48'. If it is desired to retain the valve open the reset stem 67' is merely pushed down and the valve remains open until it is again manually raised. The sleeve 146 on lifting upward of the stem 67' assures that the magnet 48' will be raised.

In the case of either of the modifications in the normal cycle of operation, the upper magnet remains in its upper position and the lower magnet is raised or lowered according to the heat conditions in the space being heated.

If dangerously heated conditions exist it is desirable to provide a safety feature to shut off the valve at all events. For this purpose the ball 80 is of Curie metal having a Curie point at such a point that may be considered a dangerous temperature for example, 700° F., 800° F., etc. so that if the temperature ever reaches that point the ball 80 would become non-permeable and no longer attracted by the lower magnet 38 and permitted to drop to close the valve seat 78. The Curie point of the ball 80 is therefore considerably higher than that of the strip 26.

While I have herein shown and described certain preferred forms of my invention, manifestly it is susceptible of modification and rearrangement of the parts without departing from the spirit and scope thereof. I do not, therefore, wish to be understood as limiting my invention to the precise forms herein disclosed, except as I may be so limited by the appended claims.

I claim as my invention:

1. In a diaphragm actuator, a non-magnetic casing, a gastight chamber below said casing, a gas line passing through said chamber, a high permeability closure member in said chamber, said closure member being vertically movable and in one position operable for closing said line, said casing being divided into a lower and an upper part, a magnet vertically movable in each part of the casing, said magnets being arranged with respective like poles opposing, an armature in the casing between said magnets, said armature being permeable when below a predetermined temperature and non-permeable when above said temperature, an element of high permeability steel in the upper end of said casing above the upper magnet to normally retain said upper magnet in elevated position, said upper magnet being manually movable away from said element, and a thrust element carried by said upper magnet to engage said lower magnet and move it away from said armature.

2. In a diaphragm actuator, a non-magnetic casing, a gastight chamber below said casing, a gas line passing through said chamber, a high permeability closure member in said chamber, said closure member being vertically movable and in one position operable for closing said line, said casing being divided into a lower and an upper part, a magnet vertically movable in each part of the casing, said magnets being arranged with respective like poles opposing, spring means reacting between and biasing said magnets apart, an armature in the casing between said magnets, said armature being permeable when below a predetermined temperature and non-permeable when above said temperature, an element of high permeability steel in the upper end of said casing above the upper magnet to normally retain said upper magnet in its upper position by magnetic attraction, said upper magnet being movable away from said element and engageable with said lower magnet to move it out of contact with said armature for reset purposes.

3. In a diaphragm actuator, a non-magnetic casing, a gastight chamber below said casing, a gas line passing through said chamber, a high permeability closure member in said chamber, said closure member being vertically movable and in one position operable for closing said line, said casing being divided into a lower and an upper part, a magnet vertically movable in each part of the casing, said magnets being arranged with respective like poles opposing, reset means engageable with both of said magnets and extending out of said casing operable upon manipulation thereof for forcing the magnets downwardly, an armature in the casing between said magnets, said armature being permeable when below a predetermined temperature and non-permeable when above said temperature, an element of high permeability steel in the upper end of said casing above the upper magnet to normally attract the same, said upper magnet being manually lowerable away from said last element and into contact with said armature, and spring means between said magnets to retain the lower one spaced from said armature when the upper one is engaged therewith.

4. In a diaphragm actuator, a non-magnetic casing, a gastight chamber below said casing, a gas line passing through said chamber, a high permeability closure element vertically movable in said chamber operable in one positon for closing said gas line, said casing having a lower part and an upper part, a magnet vertically movable in each part of the casing, a Curie metal strip between said magnets, said Curie metal strip having a portion adapted for subjection to heating means, the lower magnet when in lower position being effective for attracting and lifting said closure element and when in upper position being ineffective for retaining said closure element whereby the closure element is permitted to drop by gravity, a high permeability steel element in the casing above the upper magnet to normally retain the same elevated, spring means reacting between and biasing said magnets apart, and reset means engageable with said magnets and operable on manipulation thereof for forcing said magnets downwardly.

5. In a device of the character disclosed, a non-magnetic casing, a gastight chamber below said casing, a gas line passing through said chamber, a high permeability closure element vertically movable in said chamber operable in one position for closing said gas line, said casing having a lower part and an upper part, a magnet vertically movable in each part of the casing, an armature between said magnets, said armature being permeable when below a predetermined temperature and non-permeable when above said temperature, said armature being so disposed that when permeable the lower magnet is attracted to it and the magnet is ineffective for attracting said closure element, and when non-permeable the lower magnet is permitted to drop and the magnet becomes effective for attracting and holding said closure element, said casing having a high permeability steel element above the upper magnet, the upper magnet being attracted to said steel element and when so attracted to a position adjacent said steel element being retained against the force of attraction to said armature when the latter is permeable, said upper magnet being manually depressible to engage said armature and coacting with the lower magnet at that time to retain it spaced from said armature.

6. In a device of the character disclosed, a non-magnetic casing, a gastight chamber below said casing, a gas line passing through said chamber, a high permeability closure element vertically movable in said chamber operable in one position for closing said gas line, said casing having a lower part and an upper part, a magnet vertically movable in each part of the casing, an armature between said magnets, said armature being permeable when below a predetermined temperature and non-permeable when above said temperature, said armature being so disposed that when permeable the lower magnet is attracted to it and the magnet is ineffective for attracting said closure element, and when non-permeable the lower magnet is permitted to drop and the magnet becomes effective for attracting and holding said closure element, said casing having a high permeability steel element above the upper magnet, the upper magnet, when manually depressed being attracted to said armature when the latter is permeable and held thereby against the force of attraction to said steel element, and when said armature is non-permeable the upper magnet being movable upwardly in response to its attraction to said steel element, and when in attracted position to said steel element being held thereby against the force of attraction to said armature when the latter is permeable, said upper magnet being manually depressible to engage said armature and coacting with the lower magnet at that time to retain it spaced from said armature.

7. In a device of the character disclosed, a non-magnetic casing, a gastight chamber below said casing, said chamber having a gas line therethrough, a high permeability closure element in said chamber, said closure element being movable vertically and in one position operable for closing said gas line, a magnet vertically movable in said casing, said magnet in a lower position being effective for attracting and lifting said closure element and in an upper position being ineffective for attracting said closure element whereby the closure element is permitted to drop by gravity, and an armature in said casing above said magnet, said armature being permeable when below a predetermined temperature and non-permeable when above said temperature, said armature being disposed in such a position that when it is permeable said magnet will be attracted to it, and means for retaining said magnet in lower position against the force of attraction to said armature comprising a second magnet in said casing above said armature and having poles opposing those of the first magnet, and a thrust connection between said magnets to lower the first one when the second one is manually lowered for reset purposes.

8. In a device of the character disclosed, a non-magnetic casing, a gastight chamber below said casing, said chamber having a gas line therethrough, a high permeability closure element in said chamber, said closure element being movable vertically and in one position operable for closing said gas line, a magnet vertically movable in said casing, said magnet in a lower position being effective for attracting and lifting said closure element and in an upper positon being ineffective for attracting said closure element whereby the closure element is permitted to drop by gravity, and an armature in said casing above said magnet, said armature being permeable when below a predetermined temperature and non-permeable when above said temperature, said armature being disposed in such a position that when it is permeable said magnet will be attracted to it, manual reset means for moving said magnet downwardly away from said armature to lower position, and means for retaining said magnet in lower position against the force of attraction to said armature.

9. In a device of the character disclosed, a non-magnetic casing, a gastight chamber below said casing, a gas line passing through said chamber, a high permeabilty closure element vertically movable in said chamber operable in one position for closing said gas line, said casing having a lower part and an upper part, a magnet vertically movable in each part of the casing, an armature between said magnets, said armature being permeable when below a predetermined temperature and non-permeable when above said temperature, said armature being so disposed that when permeable the lower magnet is attracted to it and the magnet is ineffective for attracting said closure member, and when non-permeable the lower magnet is permitted to drop and the magnet becomes effective for attracting and holding said closure element, said casing having a high permeability steel element above the upper magnet, said steel element being so positioned as to be ineffective for attraction thereto by the upper magnet when the latter is in lower position, and means for manually moving both magnets to their lower positions.

10. In a device of the character disclosed, a non-magnetic casing, a gastight chamber below said casing, a gas line passing through said chamber, a high permeability closure element vertically movable in said chamber operable in one position for closing said gas line, said casing having a lower part and an upper part, a magnet vertically movable in each part of the casing, an armature between said magnets, said armature being permeable when below a predetermined temperature and non-permeable when above said temperature, said armature being so disposed that when permeable the lower magnet is attracted to it and the magnet is ineffective for attracting said closure member, and when non-permeable the lower magnet is permitted to drop and the magnet becomes effective for attracting and holding said closure element, said casing having a high permeability steel element above the upper magnet, said steel element being so positioned as to be ineffective for attraction thereto by the upper magnet when the latter is in lower position, and reset means for moving the upper magnet from upper position adjacent said steel element to lower position adjacent said armature and the lower magnet out of engagement with the armature, said steel element being effective for retaining the upper magnet in attracted position thereto after it is released from said armature due to the armature becoming non-permeable.

11. In a gas control by-pass valve, a permeable closure element for controlling the flow of gas through said by-pass valve and vertically movable to opening and closing positions, a magnet vertically movable to a lower position adjacent said closure element and to an upper position, an armature above said magnet, said armature being rendered alternately permeable and non-permeable responsive to temperature changes, and a second magnet above said armature and biased to raised position, said second magnet being manually depressible to engage said armature and operable in the depressed position to move the lower magnet away from said armature.

12. Means for controlling the flow of gas through a line, comprising, a permeable closure element in the line movable to upper and lower positions and in one position operable for closing the line, a magnet above said closure element and movable to upper and lower positions, an armature above said magnet, said armature being alternately permeable and non-permeable responsive to temperature changes, a second magnet above said armature, means to normally retain said second magnet spaced from said armature, and a thrust connection between said magnets to lower the first one as a resultant of lowering the second one against the bias of said means.

ROBERT A. WITTMANN.

References Cited in the file of this patent

UNITED STATES PATENTS

| Number | Name | Date |
|---|---|---|
| 1,853,196 | Bogle | Apr. 12, 1932 |
| 2,232,502 | Wittmann | Feb. 18, 1941 |
| 2,233,659 | Wittmann | Mar. 4, 1941 |

FOREIGN PATENTS

| Number | Country | Date |
|---|---|---|
| 74,521 | Austria | of 1918 |
| 132,267 | Austria | of 1933 |